Figure 1:
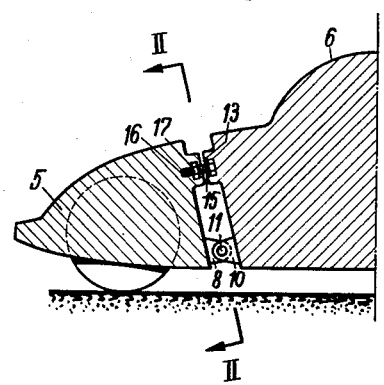

Nov. 9, 1954  B. BARÉNYI  2,693,982

CELL TYPE STRUCTURE MOTOR VEHICLE

Filed Jan. 20, 1950

Inventor
Béla Barényi
By
Diche and Padlon
attorneys

United States Patent Office 2,693,982
Patented Nov. 9, 1954

2,693,982
CELL TYPE STRUCTURE MOTOR VEHICLE

Béla Barényi, Stuttgart-Rohr, Germany

Application January 20, 1950, Serial No. 139,608

Claims priority, application Germany January 22, 1949

6 Claims. (Cl. 296—28)

This invention relates to a motor vehicle comprising a plurality of cells or body sections and to the junction of the cells of such vehicle which is composed, for instance, of a front cell, a central main cell, and a rear cell.

The following brief discussion is deemed appropriate to facilitate understanding of the term "cell" or "cellular structure" in connection with motor vehicles as used herein. By cellular construction in connection with automotive vehicles there is understood a manner of construction in which individual self-enclosed cells or sections which possess a certain amount of rigidity are produced independently of each other and which are thereafter assembled so as to form the automotive vehicle. By analogy to airplane construction, the assembly of the fuselage of the plane and of the wings has been achieved by cellular-type construction from individual airplane parts (cells) which had already been extensively completed. Such cellular-type construction in connection with airplanes has been known already for a long time and is preferred by most manufacturers. Similarly, it is also known to be feasible in connection with the construction of automotive vehicles to construct the vehicle in a cellular manner from two or more vehicle parts (cells) which in themselves are already more or less completely manufactured portions of the automotive vehicle and which constitute parts of the motor vehicle. Such parts (cells) may be covered on the outside thereof by sheet metal, plastic, or the like.

The chief object of the invention is to simplify assembling and disassembling of such body section or cell type structure vehicles. One essential feature of the invention accordingly consists in that adjacent cells are connected on the one hand by means of a joint having its axis running transversely with respect to the vehicle and on the other hand e. g. by locating members extending in longitudinal direction in such a manner that during assembling, e. g. by bolts, the two cells may execute a swivelling motion about the aforementioned joint axis to permit their freely adjusting themselves about the joint axis. This is to obviate the drawback conditioned by the articulated connection of the cells in two points, that it is very difficult to align the connecting lugs above and below and enables the advantage to compensate for inaccuracies in the alignment of the junction points without detrimentally affecting the quality of the connection.

The invention further provides for an advantageous design of the connection members at the non-articulated junction of the cells particularly with respect to an appropriate leading through of the leads from one cell into another.

Figure 3:
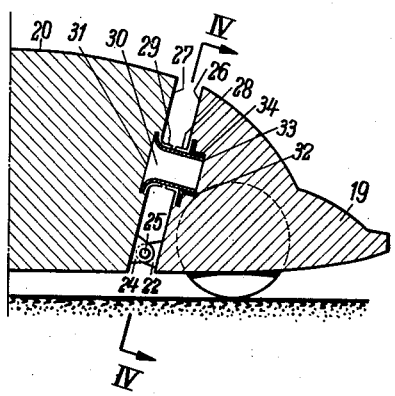
Figure 2:
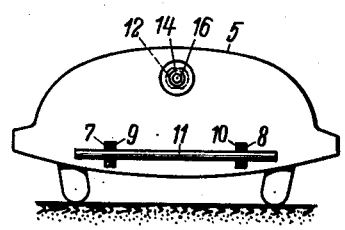
Figure 4:
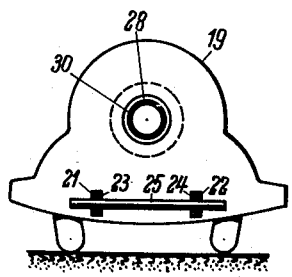

Further novel features and advantages will be apparent from the following description of some preferred examples of construction diagrammatically illustrated in the accompanying drawings, wherein Fig. 1 shows the connection of the front cell of a vehicle with the main cell in longitudinal section, Fig. 2 is a section taken on line II—II of Fig. 1, Fig. 3 shows the connection of the rear cell of a vehicle with the main cell in longitudinal section and Fig. 4 is a section taken on line IV—IV of Fig. 3.

Referring particularly to Fig. 1, there are shown a front cell 5 and the front portion of a main cell 6 of a vehicle consisting of three cells. One each side of the cells 5 and 6 there are connecting lugs 7, 8, 9 and 10 respectively arranged symmetrically and lying in the same transverse plane. For the purpose of connecting the cells 5 and 6 the connecting lugs 7 to 10 are aligned and interlocked by means of a transverse shaft or pin 11 or two bolts being secured against displacement in their longitudinal direction in any well known manner. The cells 5 and 6 contact each other above by means of two locating surfaces 12 and 13 each provided with a bore 14 and 15 respectively for introducing a cap screw 16. By screwing on and tightening a nut 17 the locating surfaces 12 and 13 are firmly pressed together. In this manner the cells may be connected also at a plurality of points, particularly in the case of heavy types of vehicles.

In the example of construction shown in Figures 3 and 4, a rear cell 19 and a main cell 20 are connected with each other as hereinafter described in a manner corresponding with that of the example of construction of Figures 1 and 2 by means of connecting lugs 21, 22, 23 and 24 respectively and a transverse shaft or pin 25. The opposite walls 26, 27 of the cells 19 and 20 respectively are as above symmetrically punched and enlarged to form a neck 28 and 29 respectively, the edges of said necks 28 and 29, which are reinforced by rings or the like, being designed for exactly fitting together. Projecting through said necks there is a hollow coupling sleeve 30 of the flange-type, one end 31 of which abuts the wall 27 of the cell 20, whilst the other end 32 is provided with an external thread 33. An annular nut 34 is screwed on the end 32 of the coupling sleeve 30 whereby the edges of the reinforced necks 28, 29 are immovably pressed together.

The assembly of the three cells of a vehicle under application of the mode of connection as described herein is conveniently effected as follows:

The main cell (6 or 20) is uniformly lifted by one or a plurality of car jacks. The front cell and the rear cell are then laterally approached to the main cell and the transverse axles or shafts (11, 25) mounted. Thereupon, the car jack is completely released or relieved and the locating means, viz. the cap screw 16 with its nut 17 and the hollow coupling sleeve 30 together with the annular nut 34 are inserted and tightened.

While this description has reference to particular forms of the invention, it will be obvious that various other forms and modifications may be resorted to without departing from the scope of the invention.

What I claim is:

1. In a motor vehicle consisting of a plurality of substantially rigid, self-sustaining cells, two adjacent cells separated from one another by a gap, rigid means located in adjacent lower end portions of said cells for pivotally connecting said two cells around a transverse axis, and clamping fastening means in said two cells located above said transverse axis for drawing together and connecting said two cells, the axis of said fastening means crossing the plane of said transverse axis and proceeding at substantially right angle thereto whereby the pivotal connection around said transverse axis facilitates the installation of said fastening means.

2. The combination according to claim 1 wherein said two cells have plane complementary, locating surfaces in the immediate vicinity of said fastening means, said surfaces lying in planes perpendicular to the axis of said fastening means.

3. In a motor vehicle consisting of several easily disconnectible substantially rigid, self-sustaining cells having gaps between said cells, two adjacent cells, means located in adjacent lower end portions of said cells for pivotally connecting said two cells about a transverse axis of the vehicle, and clamping means in said two cells for connecting said two cells outside said transverse axis, said clamping means lying in a clamping axis which crosses and runs essentially perpendicular and above said transverse axis, one of said cells having a wall, said clamping means including a sleeve provided with an annular nut and an end abutting said wall.

4. A motor vehicle comprising a central cell and two end cells and means for connecting said two end cells with said central cell comprising lower joint means on adjacent lower parts of said cells having joint axes running in a transverse direction of the vehicle for pivotally connecting said end cells to respective end portions of said central cell, and clamping means in each of said cells located above said joint axes for drawing together and connecting said end cells with said central cell at points lying above said joint axes, the axes of said clamping means crossing the plane of said transverse joint axes at substantially right angle, said central and end cells being substantially rigid and self-sustaining.

5. The motor vehicle according to claim 4 wherein said lower joint means and said clamping means effectively form a three-point connection.

6. A motor vehicle comprising a forward, intermediate and end cell, each articulated together but separable from each other for assembly, repair and replacement, said forward cell having a face with a plurality of outwardly extending lugs lying symmetrically in the same transverse plane, and a locating surface having a bore therein, said intermediate cell having a forward face opposing said face of the forward cell, and being provided with opposed outwardly extending symmetrically arranged lugs and an opposed locating surface having a bore therein, transverse shaft means interconnecting said lugs, connecting means through said bores extending substantially in the longitudinal direction of the vehicle, said intermediate cell having a rear face with a bore therein, said rear cell having a front face corresponding with the rear face of said intermediate cell and provided with a bore therein, lug means on said opposing faces of the intermediate and end cells, lug clamping means on said opposed faces, a further transverse shaft interconnecting said lug means, and coupling means extending through the bores of the opposed faces of said intermediate and end cells interconnecting the same.

References Cited in the file of this patent

UNITED STATES PATENTS

| Number | Name | Date |
|---|---|---|
| 1,806,523 | De Vizcaya | May 19, 1931 |
| 2,128,930 | Fageol et al. | Sept. 6, 1938 |
| 2,139,750 | Hicks | Dec. 13, 1938 |
| 2,248,319 | Waterhouse, Jr. | July 8, 1941 |
| 2,539,050 | Begg | Jan. 23, 1951 |

FOREIGN PATENTS

| Number | Country | Date |
|---|---|---|
| 491,383 | Great Britain | Sept. 1, 1938 |
| 506,845 | Great Britain | June 6, 1939 |